United States Patent [19]

Mani et al.

[11] 4,229,708
[45] Oct. 21, 1980

[54] X-RAY LASER

[75] Inventors: Siva A. Mani, Burlington; Howard A. Hyman, Belmont; Jack D. Daugherty, Winchester, all of Mass.

[73] Assignee: Avco Everett Research Laboratory, Inc., Everett, Mass.

[21] Appl. No.: 785,902

[22] Filed: Apr. 8, 1977

[51] Int. Cl.² ............................................. H01S 3/22
[52] U.S. Cl. ........................... 331/94.5 G; 331/94.5 P
[58] Field of Search ..................... 331/94.5 P, 94.5 C, 331/94.5 G

[56] References Cited

PUBLICATIONS

Bushuev et al., *Soviet Physics–USP.*, vol. 17, No. 6, May–Jun., 1975, p. 942–949.
Bhagavatula, V.A., *Journal of Applied Physics*, vol. 47, No. 10, Oct. 1976, pp. 4535–4537.
McGuire et al., *Applied Optics*, vol. 16, No. 1, Jan. 1977, pp. 83–88.
Hyman et al., *Optics Communications*, vol. 20, No. 2, Feb. 1977, pp. 209–213.

*Primary Examiner*—William L. Sikes
*Attorney, Agent, or Firm*—Melvin E. Frederick

[57] ABSTRACT

This invention is directed towards a scalable X-ray laser comprising means for providing an active medium of lithium-like atoms or ions, means for producing in the active medium a population of low density ions in an excited intermediate metastable state and a visible or near infrared laser to stimulate X-ray lasing by resonant or non-resonant antistokes Raman process to the ground state of the ions. The irradiation of the ions by the laser provides phased or traveling wave excitation which produces the desired directivity. Production of the metastable state is provided by directing energy from a suitable source, such as a high power short pulse laser beam, onto a target material and causing it to radiate as a black body, filtering this radiation to derive radiation in the soft X-ray region, and directing this filtered radiation into the lithium-like vapor.

19 Claims, 9 Drawing Figures

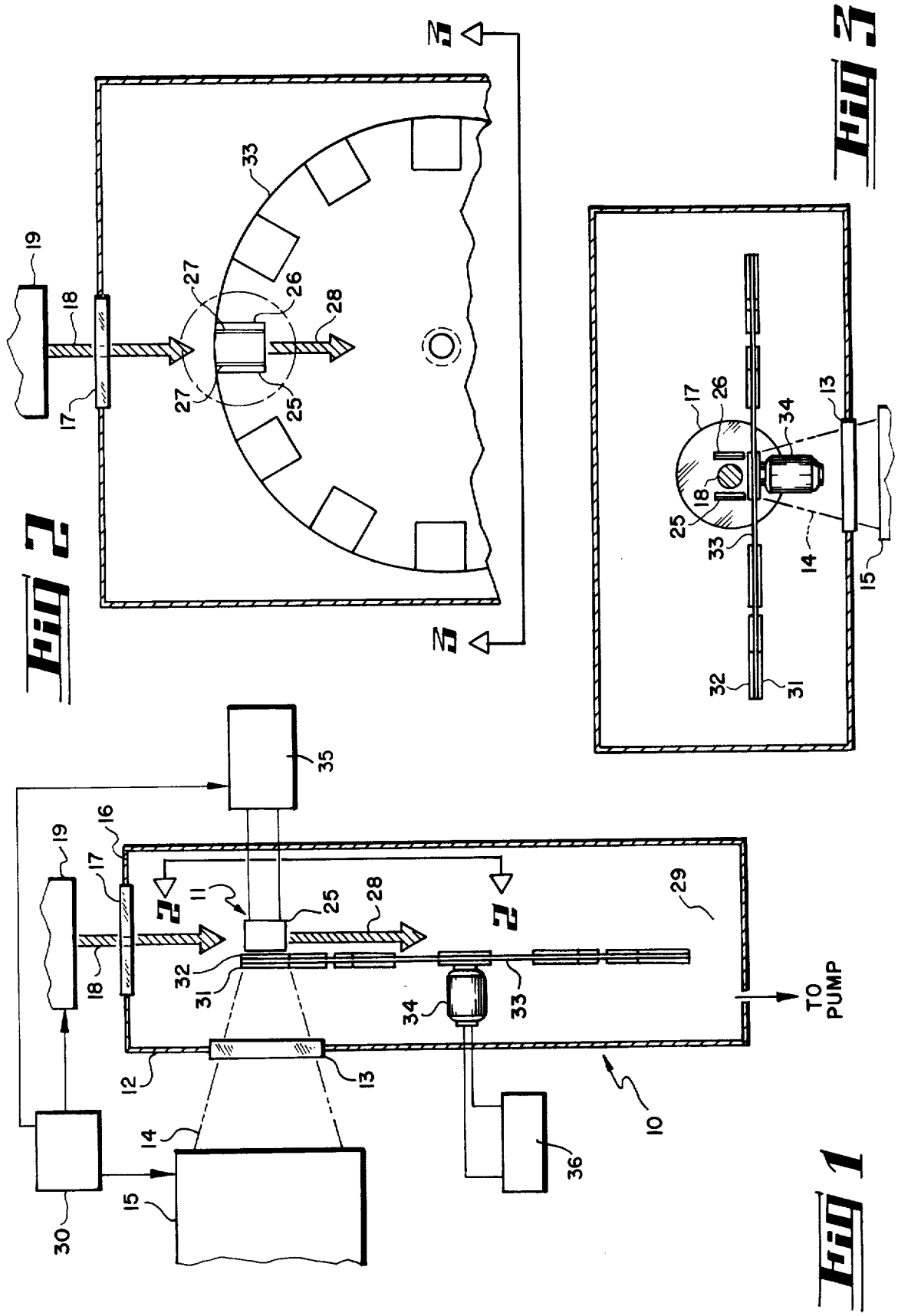

X-RAY LASER

The present invention relates generally to lasers and more particularly to X-ray lasers employing a lithium-like vapor as the active medium.

The strong interest in the coherent generation and guiding of X-rays has led to many investigations relating to the problems of pumping atomic media to obtain laser action in the X-ray region.

The goal of achieving laser action in the VUV/X-ray range ($1 \text{ Å} < \lambda < 1000 \text{ Å}$) is presently attracting a great deal of interest and many novel schemes have been proposed. The potential applications for a coherent source in this wavelength regime are wide ranging. In the area of bio-medical research, holography with such a laser could permit "photographs" of objects such as viruses, DNA or other macromolecules with dimensions below 1000 Å. A coherent X-ray source would be an invaluable tool for studying fundamental processes in a relatively unexplored wavelength region. An immediate application of an X-ray laser would be its use as a diagnostic tool in the study of high density plasmas for laser fusion. Remote sensing of various elements using X-ray induced fluorescence or diffraction is another interesting application. An important consideration for X-ray laser applications is the potential scalability of an X-ray laser to higher energies and shorter wavelengths. Most of the schemes suggested thus far fail to meet the last two criteria.

As early as 1967, it was proposed that an inversion could be obtained on X-ray transitions by ejection of an inner shell electron, for example, by photoionizing a K-shell electron in atomic copper. However, a major problem with K-shell ejection in heavy atoms immediately became apparent: the resulting excited ionic state can decay via a radiationless, Auger transition in $\sim 10^{-14}$ sec, and the pump risetime must be very fast in order to compete with this very fast deactivation process. It was subsequently suggested that the difficulties associated with the Auger effect can be circumvented by ejecting a more loosely-bound inner-shell electron, so that the ionic state that is formed is not energetic enough to undergo further spontaneous (Auger) ionization. Such a case occurs for the photoionization of a 2p electron in neutral sodium, which creates an inversion on the 372 Å, 3s→2p transition. For a more thorough discussion, see M. A. Duguay and P. M. Rentzepis, Appl. Phys. Lett. 10, 350 (1967) and W. W. Jones and A. W. Ali, Phys. Lett. 50A, 101 (1974).

A problem encountered in the last-noted scheme is the short spontaneous radiative decay time of the upper laser level of about 0.32 nsec., so that again the risetime of the pump source must be fast. A major advance in this regard was the suggestion that excitation could be stored in highly-excited metastable ions, which could then be transferred to an upper laser level using visible or near-IR radiation. See H. Mahr and U. Roeder, Opt. Commun. 10, 227 (1974). For example, the ejection of a K-shell electron in atomic lithium produces the metastable Li$^+$ (1s2s) state. This state is free from Auger ionization and can only decay to the 1s$^2$ ground state by 2-photon emission, a process with a lifetime of about 500$\mu$ sec.

By using the metastable states, Mahr et al hoped that lasing could be achieved in a device where the metastables would flow across the cavity, and mirrors at X-ray wavelengths would help build up the X-ray flux. Two fundamental problems, however, were not addressed. The caveat regarding this method, and an important feature of the present invention, is that it is not the intrinsic metastability of the ion [500$\mu$ sec for Li$^+$ (1s2s)] that is important, but rather the effective metastability of the ion in its environment. This was not pointed out or suggested by Mahr et al.

Considering the lithium example above, the electron impact mixing rate between the 1s2s and 1s2p states is approximately $3 \times 10^{-7}$ cm$^3$/sec. For an electron density of approximately $8 \times 10^{16}$ cm$^{-3}$, the effective lifetime of the "metastable" state is only 40 psec (the same as the lifetime of the upper laser level shift) and the pumping advantage of using a metastable state in this case is clearly lost. Since the flow time in the cavity is characteristically of the order of acoustic times (flow velocity is approximately 10$^5$ to 10$^6$ cm/sec), the maximum possible operating density in the scheme of Mahr et al is clearly limited to less than 10$^{12}$ cm$^{-3}$, resulting in a very low gain and, consequently, a in path length. Mahr et al for this reason proposed using mirrors and forming a cavity for X-rays. However, so far as is known, no mirrors are known to exist in the wavelength $1 \text{ Å} < \lambda < 500 \text{ Å}$, and thus the Mahr et al proposal is not a workable scheme under the present state-of-the-art technology. Finally, the Mahr et al scheme involves transferring the excited, metastable ions into the nearby 1s2p level by absorption of picosecond light pulses of the 1s2s→1s2p wavelength. The stimulated emission cross section for lasing from the 1s2p level is significantly lower than for the Raman process to be described below. Additionally, the scheme of Mahr et al is not scalable to large volumes because of flow considerations and the very low density of operation, and, secondly, not achievable since no mirrors at the soft X-ray wavelengths exist.

The present invention does not involve (i) the flow of lithium ions, (ii) the use of mirrors at soft X-ray wavelengths, and (iii) conventional stimulated emission from the 1s2p level. Briefly, the X-ray laser of the present invention comprises photoionization of a K-shell electron in lithium or lithium-like ions using incoherent soft X-ray photon fluxes (10–1000 Å) as derived from laser-produced plasmas or other suitable thermal sources. Accumulation of ions in the metastable state to a density of approximately 10$^{14}$ cm$^{-3}$ can be achieved over time scales of several nanoseconds. After a sufficient buildup of metastable ions, a laser, such as, for example, a dye laser tuned to the 9584 Å 1s2s$^1$S→1s2p$^1$P transition, is switched on, and lasing at 199 Å occurs due to the stimulated-resonant-Raman antistokes process. The peak stimulated emission cross section in the resonant-Raman process is 3 to 5 times larger than that in a conventional lasing process (i.e., stimulated emission) from the 1s2p$^1$P level. Furthermore, for the Raman process to operate, inversion needs to be achieved only between the initial 1s2s metastable state and the final 1s$^2$ ground state; for lasing to occur in the scheme of Mahr et al, on needs inversion between the 1s2p state and the 1s$^2$ state, which is much more difficult to achieve. The dye laser acts as a travelling wave excitation source, providing a co-linear well-collimated X-ray laser beam. Single pass lasing can be achieved over gain lengths of a few centimeters.

Perhaps the most important advantage of lasers in accordance with the present invention is the moderate pumping requirement; the pulse width of the pump laser is shifted to the nanosecond regime, as opposed to the picosecond scale required by other X-ray laser schemes, which attempt to directly pump the upper laser level. A further advantage of lasers in accordance with the present invention is that they are scalable to shorter wavelengths and also larger geometries, and therefore high output energies.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a diagrammatic side view of an X-ray laser in accordance with the present invention;

FIG. 2 is an end view taken on line 2—2 of FIG. 1;

FIG. 3 is a bottom view taken on line 3—3 of FIG. 2;

Figure 4:
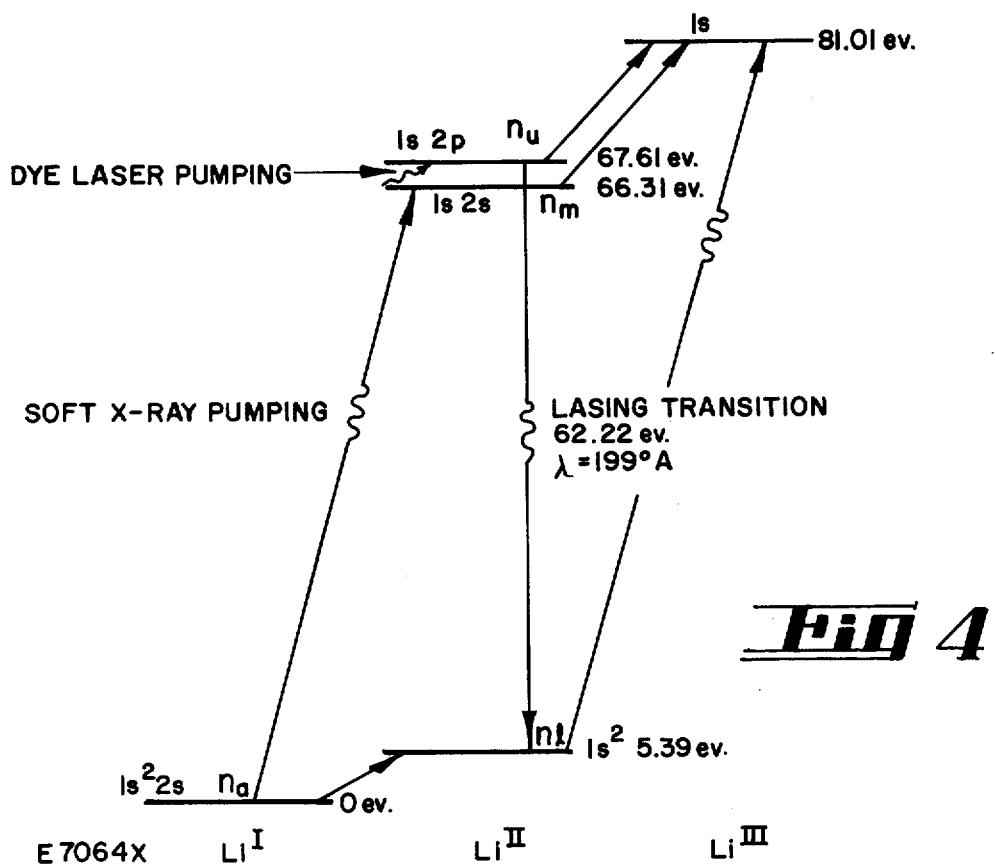
FIG. 4 is a diagram of the energy levels of the lithium atom.

The principles underlying the present invention will now be explained in conjunction with the embodiments illustrated in FIGS. 1-3. It is to be understood that the invention is not limited to that shown and described. Thus the active medium may include the gases or vapors of lithium-like atoms or ions, i.e., lithium atoms or ions of beryllium, boron, carbon, nitrogen, oxygen, fluorine, neon and the like having the ionic configuration $1s^2 2s$. Any suitable source and associated means are contemplated for producing the required black body radiation for irradiating the active medium to raise its atoms or ions to the metastable state; and in the use of a laser as the source, any laser is contemplated that has the characteristics suitable for producing the required radiation to pump the active medium.

Directing attention now to FIGS. 1-3, there is shown an evacuated enclosure 10 having disposed within it means defining the working region 11.

Disposed in one wall 12 of enclosure 10 is a first laser window 13 for admitting a high power focused priming laser beam 14 from a priming laser system 15. Disposed in a second wall 16 is a second window 17 for admitting a pumping laser beam 18 from a pumping laser source 19, such as, for example, a dye laser or laser system.

The working region 11 is defined by two plate members 25 and 26 adapted to be heated by pulse generator circuitry 35 and spaced one from another and having, for example, lithium 27 disposed on their inner facing surfaces. The laser beams are disposed at right angles one to another and along the longitudinal and transverse axis of the working region. The output beam 28 exits from the working region along the longitudinal axis and in the same direction as the pumping laser beam 18. A target or the like is preferably disposed within enclosure 10 as at 29 and in the path of the output beam 28.

Disposed between the working region and the priming laser window 13 is a thin sheet 31 of target material and a thin sheet 32 of filter material more fully described hereinafter. As shown, a plurality of opposed sheets of target and filter material may be radially disposed in spaced relationship at the periphery of a wheel 33 driven by an indexing motor 34 controlled by indexing motor control circuitry 36. The sheets of material and the wheel are so disposed and arranged that each set of target and filter material may be indexed to a position adjacent one open side of the working region whereby the priming laser beam will impinge on the target material.

Broadly, in operation, the enclosure is evacuated to a vacuum suitably less than the operating density of the lasing species, for example, $10^{-6}$ Torr can be conveniently reached, and the priming laser beam 14 comprising a short, high power laser beam pulse is caused to impinge on the target material 31. This laser beam pulse is of such size and energy density as to cause the target material to heat up rapidly and subsequently vaporize. For a short period of time during the heating process, the target material radiates as a black body at about 50 eV or higher for lithium. This radiation passes through the filter material which blocks most of the radiation greater than about 110 eV and less than about 30 eV. For lithium, with drivers of significantly higher temperatures than 50 eV, calculations indicate that the need for a filter foil decreases. The resulting radiation in the soft X-ray region emerging from the filter material (which may also subsequently be vaporized) passes into the active medium such as lithium vapor in the working region. The lithium vapor may be conveniently provided by causing the plate members to be electrically heated by pulse generator circuitry 35 to a temperature sufficient to vaporize the lithium on their inner surfaces and produce the necessary lithium vapor as the active medium in the working region.

The lithium vapor may be at a density of about $10^{13}$ to $10^{15}$ cm$^{-3}$ and preferably about $10^{14}$/cm$^3$ or $3 \times 10^{-3}$ Torr. The soft X-ray radiation source may be any sufficiently rapid energy source, for example, electron beams, exploding wires, imploding cylinders, and the like. The resulting radiation raises the lithium atoms to a metastable level and the metastable atoms are then made to lase at 199 Å by the stimulated-resonant-Raman process, using a laser pumping beam at 9584.1 Å provided by a suitable source such as a dye laser. In conventional manner, trigger and/or timing circuit means 30 are provided to actuate in the correct timed relationship the priming laser system 15, the Raman pumping laser source 19, and the means 35 for providing the active medium.

Figure 5:
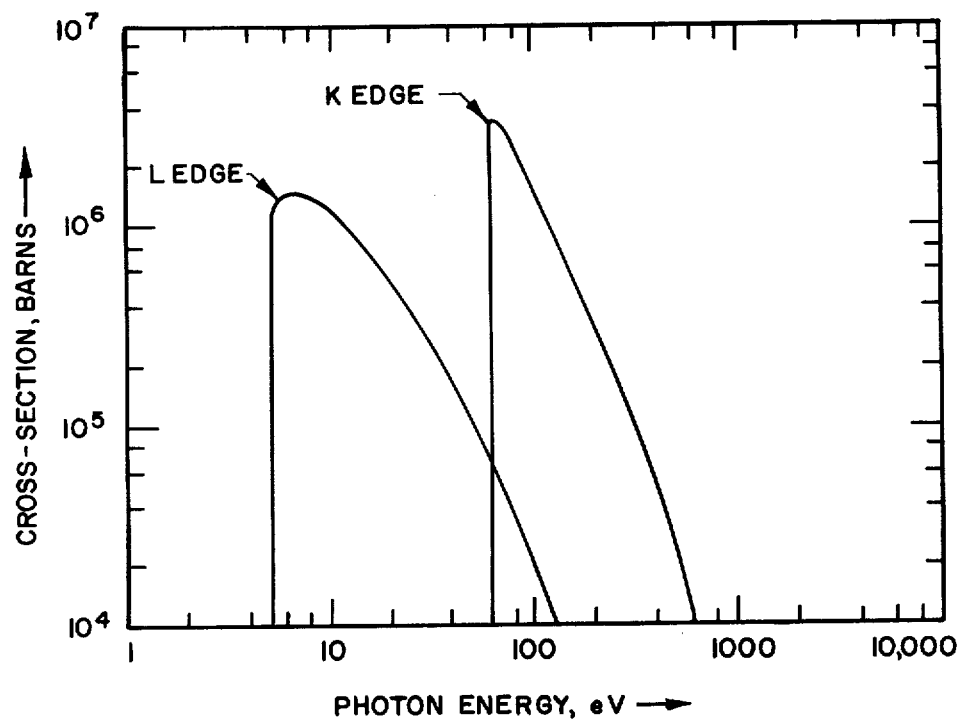
FIG. 5 is a schematic diagram of the absorption spectrum of lithium.

For purposes of simplicity and convenience, the following discussion is based on the use of lithium, which is the simplest atom for pumping into the metastable state. The energy levels of the lithium atom and a schematic diagram of its absorption spectrum are shown in FIGS. 4 and 5. K-shell photoionization into the Li+ 1s2s state can be preferentially carried out with photons of energy $\gtrsim 66$ eV and lithium ions will accumulate in the 1s2s metastable state up to a time of the order of a 10-30 nsec. Depletion of the metastable state occurs by: (1) photoionization into the Li++ 1s or 2s state, (2) ionization by inelastic collisions with background photoelectrons into the Li++ 1s state, and (3) mixing into the Li+1s2p state. Photoionization of the Li++2s state requires photons of energy ≳107 eV which are filtered out of incident soft X-ray photon flux in accordance with the invention.

The ionization potential of the Li+1s2s→Li++1s transition is very much higher than the energy difference between 1s2s and 1s2p states. Hence, the mixing cross section is much larger than the electron-impact ionization cross section. Thus, the most serious loss mechanism of 1s2s ions is mixing into 1s2p level, which then spontaneously decays to the lower laser level (1s²). At low electron densities, the mixing time is rather large and this, in fact, determines the effective metastability and maximum operating density. However, for the Li+ ion, the energy difference between 1s2s and 1s2p states is only 1.29 eV, and soft X-ray lasing at 199 Å can be achieved with a tunable dye laser at λ=9584.1 Å in a resonant-Raman process in accordance with the invention.

The population of the lower laser level determines the threshhold value of metastable state population necessary for lasing, and it represents a critical factor for successful operation of an X-ray laser in accordance with the present invention. The lower laser level is the 1s² state of Li+ ion and is filled by: (1) spontaneous and stimulated emission from the 1s2s metastable level during the Raman process, (2) excitation by electrons to the 1s2p level from the 1s2s metastable state and subsequent spontaneous decay, and (3) ionization of the neutral 1s²2s atom by both electrons and low energy photons. The 1s² lower level is, in turn, depopulated by photoionization by photons whose energy is in excess of 75 eV. A serious pressure dependent mechanism which can quench laser action is electron impact ionization of neutral atoms; however, for the operating regime of the invention, this effect is small for the following reasons. For low lithium vapor density and high pump fluxes, the photoionization into the 1s2s states takes place at such a high rate that there are very few neutral atoms left for either photo or electron impact ionization to fill the lower laser level. Secondly, the large flux of high energy photons ionizes the Li+1s² laser level, thereby reducing its population. For the lithium vapor pressure and flux conditions here considered, only a small fraction of the neutral atoms end up in the lower laser level as a result of direct ionization. The crucial process that can prevent laser action is the electron mixing of 1s2s and 1s2p states discussed in (2) above. However, this can be controlled by changing the operating density of the lasing species, which in turn will change the electron density. For example, at an electron density of $10^{14}$ cm$^{-3}$, the mixing rate is $\sim 3 \times 10^7$ sec$^{-1}$ and thus metastability should be preserved for approximately 30 nanoseconds. See S. A. Mani, H. A. Hyman and J. D. Daugherty, J. App. Phys. 47, 3099 (1976) for a complete discussion, which article is incorporated herein as if set out at length.

An advantage of the present invention compared to all other known methods using photoionization to create an inversion resides in the fact that the pumping of the ions into the metastable state allows use of moderate soft X-ray pump intensities and risetimes. The burden of the fast risetime is shifted from the soft X-ray pump source to a tunable dye laser of larger wavelength and much lower pulse energy.

Extension of the concept here concerned to other lithium-like ions may be expected to produce outputs in the 10–100 Å range. Several parameters associated with lithium-like ions have been tabulated. Table I set forth below shows the wavelengths of the 1s2s→1s2p transition and the X-ray laser wavelength for lithium-like ions with atomic number Z ranging from 3 to 10. Also given are the metastable state lifetime and spontaneous emission rate.

TABLE 1

| | WAVE LENGTH SCALING | | | |
|---|---|---|---|---|
| ION | X-RAY LASER WAVE-LENGTH Å | 1s2s→1s2p TRANS-ITION WAVE-LENGTH Å | NATURAL TANEOUS LIFETIME OF METAST-ABLE STATE SEC | SPON-TANEOUS EMISSION RATE FOR THE 1s2p→1s² TRANSITION SEC$^{-1}$ |
| Li$^{II}$ | 199.3 | 9584.1 | $5.13 \times 10^{-4}$ | $2.56 \times 10^{10}$ |
| Be$^{III}$ | 100.3 | 6142.7 | $5.52 \times 10^{-5}$ | $1.22 \times 10^{11}$ |
| B$^{IV}$ | 60.3 | 4490.6 | $1.08 \times 10^{-5}$ | $3.72 \times 10^{11}$ |
| C$^{V}$ | 40.3 | 3525.7 | $3.02 \times 10^{-6}$ | $8.87 \times 10^{11}$ |
| N$^{VI}$ | 28.8 | 2893.8 | $1.96 \times 10^{-6}$ | $1.81 \times 10^{12}$ |
| O$^{VII}$ | 21.6 | 2447.0 | $4.33 \times 10^{-7}$ | $3.31 \times 10^{12}$ |
| F$^{VIII}$ | 16.8 | 2113.4 | $1.98 \times 10^{-7}$ | $5.59 \times 10^{12}$ |
| Ne$^{IX}$ | 13.5 | 1853.5 | $1.00 \times 10^{-7}$ | $8.88 \times 10^{12}$ |

The list of ions given in Table I above is not intended to be exhaustive; lithium-like ions with Z>10 can also be used to obtain still shorter X-ray wavelengths. However, since the metastable lifetime decreases as $Z^6$, pump sources with much faster risetimes will be required to reach the λ ~ 1 Å range.

It may be expected that about 95% of the initial lithium vapor will end up in the metastable state with the remainder being ionized by photons and electrons and filling the lower laser level. For an initial neutral density of about $10^{14}$ cm$^{-3}$, a suitable pump flux is about $5.2 \times 10^8$ W/cm² of 66 eV photons, assuming an average value of $2 \times 10^{-18}$ cm² for the photoionization cross section. Since the photoionization in accordance with the invention is carried out with incoherent radiation from a black body source, the actual flux requirements are slightly higher than this figure. The preceding discussion illustrates that lithium atoms can be pumped to the metastable state with moderate soft X-ray intensities.

The lifetime of the metastable 1s2s state is mainly determined by the electron mixing rate to 1s2p. For $n_e \approx 10^{14}$ cm$^{-3}$, this rate is about $3 \times 10^7$ sec$^{-1}$ giving a lifetime of 33 nsec. To achieve lasing between the 1s2s and the 1s² state, the dye laser, which is in resonance with the 1s2s→1s2p transition is switched on after the 1s2s population is built up. Since the spontaneous decay rate of 1s2p→1s² transition is $2.56 \times 10^{10}$ sec$^{-1}$, the flux of the dye laser must be sufficiently high in order for the Raman process to dominate over normal absorption of dye photons followed by subsequent emission of X-ray photons in a two-step transition.

Provisions of the photon flux needed to excite lithium atoms and lithium-like ions to the metastable state is a critical aspect in the provision of a 199 Å laser in accordance with the present invention. A laser-produced plasma may form the source of intense radiation and be produced by using a laser pulse having a rise-time of about a nanosecond and pulse energies of 500 to 1000 joules. Our consideration of the rapid growth in pulsed $CO_2$ laser technology over the last four years combined with recent calculations on laser beam-target interactions persuaded us that laser-produced plasmas are suitable sources of soft X-rays for the purposes here concerned. For exciting a lithium vapor laser of the present invention, it is preferable to have a black body source at a temperature of 50 eV or more since its spectral characteristics would closely match that needed for selective inner-shell photoionization. The flux from a 50 eV black body, however, is about $6.4 \times 10^{11}$ W/cm$^2$ and $\sim 20\%$ of this flux is in the "useful" band. The flux necessary to pump lithium is 1 to $3 \times 10^9$ W/cm$^2$. If the black body source is a line source, the flux will fall off inversely with distance from the source which would enable pumping of a reasonable volume of lithium vapor.

The design of a foil target which will radiate as a black body of a specific temperature for the least amount of input energy is indeed a non-trivial task. For optimum design, several factors, including $CO_2$ laser absorption by inverse Bremsstrahlung, foil expansion and heating, optical absorption depth in the foil, etc. must be calculated as a function of time and such calculations are best handled by complex computer codes.

With no wavelength selection between the black body UV source and the working medium, there are two deleterious effects which can occur. In the first place, for lithium vapor, low energy photons directly populate the lower lasing level as a result of the $1s^2 2s > 1s^2$ transition. This process has an absorption edge at 5.39 eV as shown in FIG. 5. Further photoionization of the $1s^2$ state by photons in excess of 75 eV reduces this lower lasing level population but it is advantageous, nonetheless, to remove the low energy photons. A second effect is further ionization of the 1s2s and 1s2p states by photons in excess of 14.7 and 13.4 eV, respectively. This process reduces the number of atoms in the upper states which are available for lasing. The third process is further K-shell photoionization of the 1s2s upper lasing level to the $Li^{++}$ 2s state. The K edge for this process is at $\sim 110$ eV and at high flux levels photons can depopulate the metastable level. Ideally, the pump foil thickness should be chosen to give black body emission up to 100 eV and, hence, beyond that energy, the photon emission will fall off more rapidly. However, use of a filter foil to achieve elimination of photons in excess of 100 eV from the VUV source is still desirable as long as the flux within the lithium pumping band is not significantly affected.

In accordance with the invention, a thin foil of filter material such as beryllium, or a mixture of beryllium and other materials, such as lithium and aluminum, acts as an effective photon filter for both the high and low bands of undesirable photons without significantly attenuating the 65 eV pumping flux. The thickness of the necessary foil of filter material is within state-of-the-art fabrication techniques and since low gas pressure exists on both sides of the foil, there are no structural problems.

Figure 6:
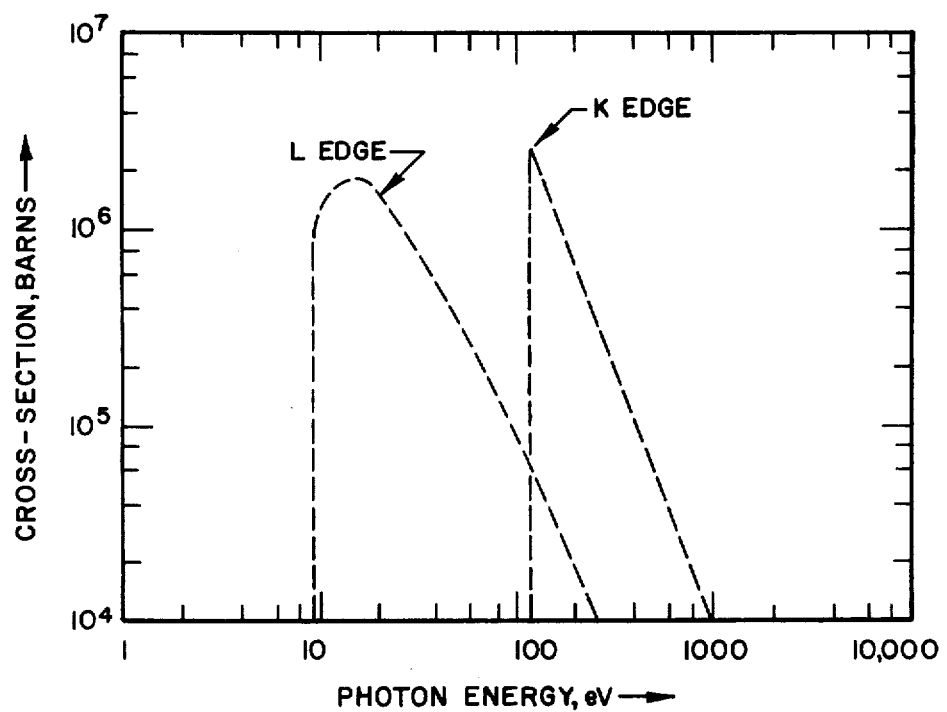
FIG. 6 is a schematic diagram of the absorption spectrum of beryllium.
Figure 7:
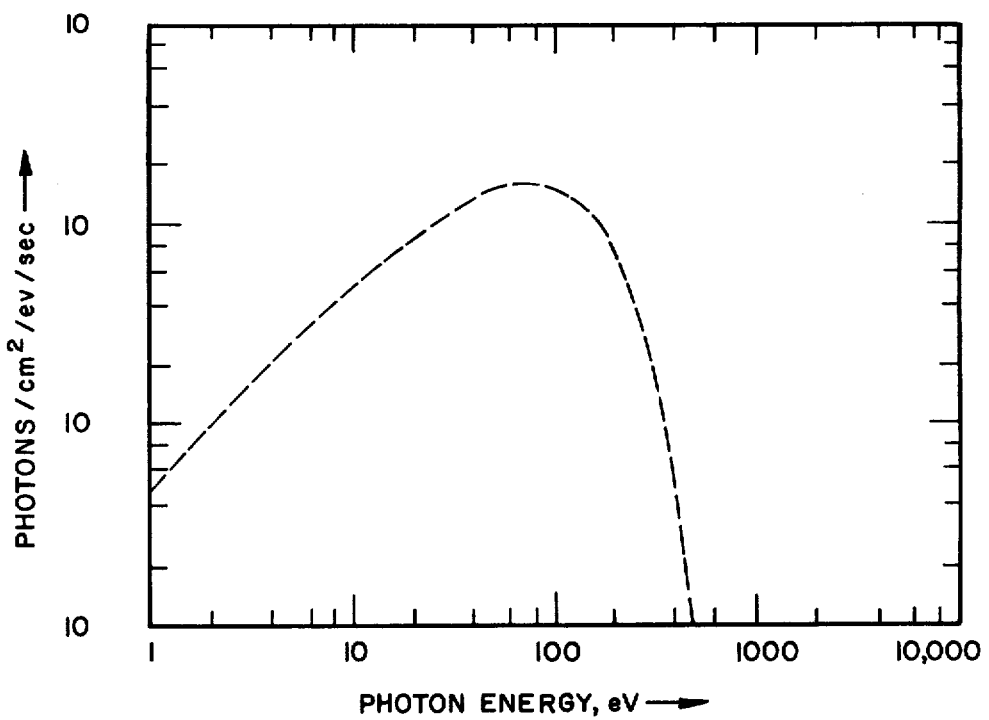
FIG. 7 is a schematic diagram of the emission spectrum of a 50 eV black body.
Figure 8:
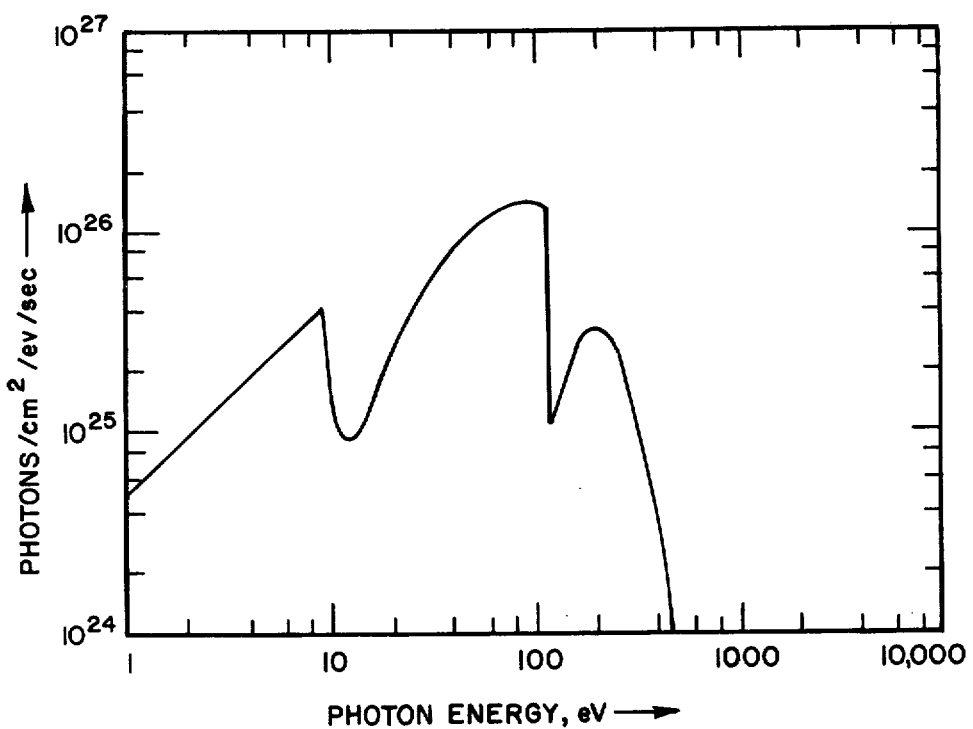
FIG. 8 is a schematic diagram of the spectrum of a 50 eV black body filtered through a 1000 Å beryllium foil.

The absorption spectrum of beryllium is shown schematically in FIG. 6 and the spectrum of a 50 eV black body is shown in FIG. 7. In FIG. 8, the spectrum of a 50 eV black body filtered through a 1000 Å thick beryllium foil is shown. Comparison of this filtered spectrum with the absorption spectrum of lithium (FIG. 5) clearly shows the desirability of filtering the black body source.

A composite filter is desirable for the reasons that, for example, for a composite filter comprising beryllium, aluminum and lithium, beryllium and aluminum filter out radiation that will pump lithium to undesired levels and lithium filters out unwanted autoionizing lines.

The effect of pinholes in the filter foil is to decrease the effectiveness of the photon filter. The pinholes allow the entire plasma radiation spectrum to pass. If the pinholes are small as compared to the size of the filter foil and randomly distributed, the radiation in the lithium vapor will be spatially uniform and will consist of both filtered and unfiltered spectra. The net effect is to decrease the ratio of the excitation rate of the 1s 2s to the $1s^2$ states for no pinholes.

Beryllium foils of 1000 Å have been constructed by flotation techniques and such or composites are easily incorporated into the design of the working region. The support structures of the filter foil tend to block off all the radiation incident thereon. However, with structural spacing of $\sim 1$ cm and a thickness of $\sim \frac{1}{2}$ mm, the radiation loss due to foil support structures should not exceed about 5%.

There are several requirements for the tuned IR pump laser 19 which transfers lithium ions from the metastable state to the $1s^2$ level in the Raman process. First, the laser pulse must have sufficient photons to bleach the 1s 2s→1s 2p transition. Second, the risetime of the laser pulse must be comparable to or faster than the spontaneous decay time of the upper lasing level which for lithium is 40 psec. Third, the wavelength of the laser must be tuned to that of the 1s 2s→1s 2p transition with bandwidth comparable to absorption width of the transition and jitter should be significantly smaller than this width. If the Raman pump laser is not tuned to the wavelength of the 1s 2s→1s 2p transition, X-ray lasing can still be achieved through a non-resonant Raman process. However, the stimulated emission cross section off resonance is smaller than on resonance, necessitating a longer gain path length. Finally, the laser pulse must be synchronized to pass through the lithium vapor cell after a significant population of the metastable state has been achieved.

A flux of about $10^6$ W/cm$^2$ (resonant with the 1s 2s→1s 2p) is sufficient for the resonant Raman process. For a laser channel cross section of $\frac{1}{2}$ cm $\times \frac{1}{2}$ cm and a pulse width of 50 psec, computations indicate that the required pulse energy is about 12.5 $\mu$J. However, a conservative estimate of the number of IR photons required is equal to the total number of lithium atoms initially present in the cell. Assuming a volume of $\frac{1}{2}$ cm $\times \frac{1}{2}$ cm $\times 20$ cm $= 5$ cm$^3$, an initial lithium atom density of $10^{14}$ cm$^{-3}$, and a photon energy of 1.29 eV, the required pulse energy is about $\sim 0.1$ mJ.

It is suggested that the IR laser pulse energy be increased by a factor of 10 to 1 mJ under the assumptions that transform limited conditions will not be achieved and that wavelength jitter will be present.

In the present invention, although the gain is adjusted for amplified spontaneous emission (ASE) operation, the IR pump laser 19 provides not only an automatic traveling wave excitation, but also provides a steering mechanism for the output beam and some degree of control of the beam divergence angle.

Figure 9:
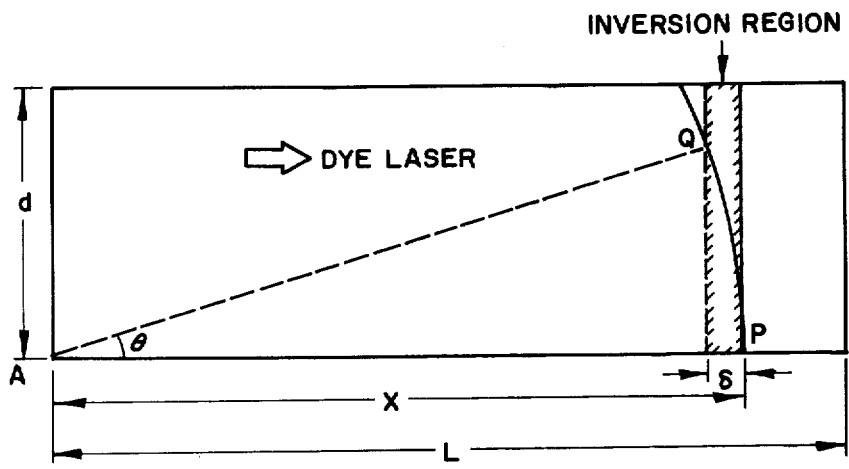
FIG. 9 is a schematic diagram of a working region for illustrating the collimation property of the output beam and the traveling wave excitation within the working region.

For a conventional superradiant laser, the beam divergence is given by $\alpha = d/L$ where d is the transverse dimension of the laser cross section and L is the gain length. In the present invention, the divergence angle can be smaller than $\alpha$. Referring now to FIG. 9, consider a cylindrical laser cavity or working region of diameter d and length L. At some time after the initiation of the IR laser pulse, the zone of inverted population will be located at X as shown in FIG. 9. The width of this zone, $\delta$, is given by $c\tau_R$, where $\tau_R$ is the inverse of the Rabi frequency.

A photon starting from point A will thus be amplified for all directions of travel from 0 to $\theta$ where $\theta$ is the angle defined by equal length segments AP and AQ. The triangle relationship $$\cos\theta = (x - \delta)/x$$

can be solved to first order in the small parameter $(\delta/x)$ to give $$\theta \approx \sqrt{2\delta/x}$$

Thus the beam divergence $\alpha$ is obtained by taking the limit $x \to L$ to get $$\alpha = \sqrt{2\delta/L}$$

The beam divergence is therefore given by $\sqrt{2\delta/L}$ for all values greater than d/L below which the divergence is given by d/L. This collimation property of the present invention is an important factor for its volumetric scalability.

The traveling wave excitation provided by the tuned near IR laser in accordance with the present invention allows control of the divergence of the X-ray laser in several possible ways and, hence, volumetric scaling. For example, if the tuned near IR laser beam 18 has a spatial profile which is striated in the form of many small cylinders as, for example, may be provided by a plurality of IR laser beams, then the X-ray output laser beam 28 will also take the form of an array of cylinders. In this case, the divergence of the X-ray laser beam would be characteristic of the diameter of the individual cylinders and not the overall beam diameter. Furthermore, if individual cylinders were not present simultaneously, but are staggered in time, the pulse width, risetime, etc. of the X-ray output beam may be shaped as desired at least on time scales up to a few nanoseconds for lithium densities of $\sim 10^{14}$ cm$^{-3}$.

For the lithium embodiment here concerned, the requirements on the soft X-ray source are flux levels of the order of $10^9$ W/cm$^2$ in the energy range 65–105 eV and with risetimes of a few nanoseconds. To generate a plasma which will radiate with these parameters and provide a primary pump source for the X-ray laser, an energy source providing about $\sim 1000$ J in 2 nsec may be used. Several choices may be considered for this energy source including (1) exploding wires, (2) imploding cylinders, (3) a Nd: glass laser system at 1.06$\mu$, and (4) a CO$_2$ laser system at 10.6$\mu$. However, while an exploding wire generator is limited in risetime because of the inductance of the load, namely, the thin exploding wire, imploding cylinder generators have produced black body radiation at several hundred eV with a risetime of a few nanoseconds. With regard to glass laser systems, the present state-of-the-art for glass laser systems has advanced to the present construction of a 10$^4$ Joule laser with a pulse width less than a nanosecond.

A CO$_2$ laser system exists which, with state-of-the-art modifications, has the capability of 10 kilojoule operation at 2 nsec pulse widths.

This system is an atmospheric pressure E-beam sustained discharge laser system comprising a 160 millijoule, nanosecond single line oscillator, a 40 liter preamplifier, a 120 liter amplifier and a very large power amplifier. Such oscillator-amplifier chains are capable, with no more than straightforward modifications well-known to those skilled in the art, of producing 1–2 kJ pulses with pulse widths of 1–2 nsec. Improvement of the single line oscillator to a multiline mode of operation would result in 3–5 kJ pulses in 1–2 nsec and the use of flowing saturable absorbers would finally result in pulse energies of 5–9 kJ (single-line) and 16–18 kJ (multi-line) in 1–2 nsec. Thus, CO$_2$ laser systems will also deliver the pulse energies which are relevant for the 199 Å lithium laser.

In such a system 15, for example, there may be provided a conventional mode locked laser oscillator having an unmodified output pulse of about 1$\mu$ sec which is, via a germanium crystal or the like in the optical cavity, modified to comprise a series of 2 nsec pulses. These 2 nsec pulses may then be supplied to conventional pulse selector means which is arranged and adapted to pass only one of the 2 nsec pulses having a desired and sufficiently high amplitude.

This single selected pulse may then be supplied to and amplified by the preamplifier and/or amplifier. Where the power amplifier has a cavity cross section larger than that of the amplifier, optical beam expander means may be provided to receive the output pulse of the amplifier and match it to the power amplifier.

The output of the power amplifier may then be directed to conventional optical focusing means for introduction into the enclosure 10 via laser window 13.

The requirements on the IR laser pulse for the resonant Raman process are that it be precisely controllable at 9584.1 Å and provide approximately 1 mJ in about 50 psec with a bandwidth of about 0.1 Å. The components of a system providing such a laser pulse are well-known and resemble those necessary for a suitable CO$_2$ laser system; i.e., mode locked oscillator, pulse selector and amplifier. A conventional controlled and pumped dye laser using a suitable carbocyanine dye, for example, Kodak IR 140 in DMSO solvent may be used to provide the necessary IR laser pulse requirements.

Alternately, a mode locking saturable dye may be used to produce a series of short spikes from the 6500 Å coaxial flashlamp pumped dye laser. The output of the coaxial flashlamp pumped dye laser is utilized to pump the dye cell to produce an output pulse of the desired length and wavelength. This output pulse may then be directed to and amplified by a controllable amplifier that produces the desired pumping pulses at the desired rate and which have the desired pulse length, wavelength and amplitude.

If X-ray lasing is to be accomplished through a non-resonant Raman process, the wavelength requirements on the IR laser are less stringent, but the power requirements have to be increased. For example, if a Nd: yag laser at 1.06$\mu$ with a bandwidth of 1 cm$^{-1}$ is used for the Raman process, the stimulated emission cross section at a flux level of $10^{10}$ W/cm$^2$ is $\sim 10^{-15}$ cm$^2$ which is to be compared to the maximum resonance Raman stimulated emission cross section of $10^{-13}$ cm$^2$. The gain length should therefore be considerably increased for the non-resonant X-ray Raman laser operation.

It is to be noted that the metastable state in reality has a multiplet structure of singlets and triplets and in the case of the lithium ion, the triplets have 1.9 volts less energy than the singlets. The Raman pumping may be carried out in a resonant manner either from the singlet state or from the triplet state. The latter transition, 1s 2s $^3$S$\to$1s 2p $^1$P, (3879 Å) is much less allowed than the former and so one needs larger flux to stimulate X-rays from the triplet state. In the case of lithium the resonant Raman pumping may be therefore achieved at both 9584.1 Å and 3879 Å. The necessary 3879 Å pulse may be produced in substantially the same manner as that described above for producing 9584.1 Å pulse with the exception of the substitution of a dye in the coaxial flashlamp pumped dye laser that will radiate at 3879 Å. Also, the amplifier will be modified to amplify and provide a 0.5 joule, 5–10 nsec pulse at 3879 Å.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A laser comprising:
   (a) a vacuum environment;
   (b) a working region within said vacuum environment wherein a population inversion may be produced in an active medium;
   (c) means for providing within said working region an active medium consisting substantially only of an atomic vapor, the constituents of which have the configuration $1s^2\, 2s$;
   (d) means for photoionizing said active medium to selectively produce a population of ions in an excited $1s\, 2s$ metastable state; and
   (e) laser means having a pumping laser beam directed into said working region effective to antistokes Raman pump said ions, said pumping laser beam producing traveling wave stimulation in said ions to cause said ions to emit photons at a wavelength $\lambda$ and produce an output laser beam at said wavelength $\lambda$ substantially only in the direction of said traveling wave stimulation.

2. A laser as described in claim 1 wherein said photoionizing means for producing metastable ions includes means for producing a plasma radiating in the soft X-ray region of the spectrum, said soft X-rays emanating from said plasma and passing through said active medium.

3. A laser as described in claim 2 wherein the density of said active medium is between about $10^{13}$ and $10^{15}$ atoms per cubic centimeter.

4. A laser as described in claim 3 wherein said means for providing an active medium provides an active medium consisting substantially only of lithium atoms.

5. A laser as described in claim 4 wherein said active medium consists substantially only of ions of beryllium, boron, carbon, nitrogen, oxygen, fluorine and neon having the electronic configuration $1s^2\, 2s$.

6. A laser as described in claim 3 additionally including filter means interposed between said plasma and said active medium for passing substantially only predetermined radiation in the soft X-ray region of the spectrum.

7. A laser as described in claim 6 wherein said active medium consists substantially only of ions of beryllium, boron, carbon, nitrogen, oxygen, fluorine and neon having the electronic configuration $1s^2\, 2s$.

8. A laser as described in claim 6 wherein said means for providing an active medium provides an active medium consisting substantially only of lithium atoms.

9. A laser comprising:
   (a) an air-tight enclosure;
   (b) pumping means adapted to be coupled to said enclosure for evacuating said enclosure;
   (c) a working region within said enclosure wherein a population inversion may be produced in an active medium;
   (d) means for providing within said working region an active medium consisting substantially only of an atomic vapor, the constituents of which have the configuration $1s^2\, 2s$;
   (e) means for photoionizing said active medium to selectively produce a preferential population of ions in an excited metastable state; and
   (f) laser means having a pumping laser beam directed into said working region effective to antistokes Raman pump said ions, said pumping laser beam producing traveling wave stimulation in said ions to cause said ions to emit photons at a wavelength $\lambda$ and produce an output laser beam at said wavelength $\lambda$ substantially only in the direction of said traveling wave stimulation.

10. A laser as described in claim 9 wherein said photoionizing means for producing metastable ions includes means for producing a plasma radiating in the soft X-ray region of the spectrum, said soft X-rays emanating from said plasma and passing through said active medium.

11. A laser as described in claim 10 wherein the density of said active medium is between about $10^{13}$ and $10^{15}$ atoms per cubic centimeter.

12. A laser as described in claim 11 wherein said active medium consists substantially only of ions of beryllium, boron, carbon, nitrogen, oxygen, fluorine and neon having the electronic configuration $1s^2\, 2s$.

13. A laser as described in claim 12 and additionally including filter means interposed between said plasma and said active medium for passing substantially only predetermined radiation in the soft X-ray region of the spectrum.

14. A laser comprising:
   (a) an air-tight enclosure;
   (b) pumping means adapted to be coupled to said enclosure for evacuating said enclosure;
   (c) a working region within said enclosure wherein a population inversion may be produced in an active medium;
   (d) means for providing within said working region an active medium comprising an atomic vapor, the constituents of which have the configuration $1s^2\, 2s$;
   (e) target material when heated being capable of radiating as a black body in the soft X-ray region of the spectrum;
   (f) means for producing a high energy short laser pulse;
   (g) means for directing said laser pulse on said target material, the energy level and length of said laser pulse being sufficient to cause said target material to radiate as a black body in the soft X-ray region of the spectrum, a portion of said radiation passing through said filter means and into said active medium and producing a population of ions in the excited metastable state; and
   (h) laser means having a pumping laser beam directed into said working region effective to antistokes Raman pump said ions, said pumping laser beam producing traveling wave excitation in said ions to cause said ions to emit photons at a wavelength $\lambda$ and produce an output laser beam at said wavelength $\lambda$ substantially only in the direction of said traveling wave excitation.

15. A laser as described in claim 14 additionally including filter means interposed between said plasma and said active medium for passing substantially only predetermined radiation in the soft X-ray region of the spectrum.

16. A laser as described in claim 15 wherein said filter material comprises beryllium.

17. A laser as described in claim 15 wherein said filter material comprises beryllium, aluminum and lithium.

18. A laser as described in claim 15 wherein upon illumination of said target material by said laser pulse, said target material forms a laser-induced plasma radiating in the soft X-ray region of the spectrum and said filter material for a predetermined length of time effectively blocks relatively low energy photons capable of ionizing outer-shell electrons of said constituents and also effectively blocks relatively high energy photons capable of ionizing the K-shell of said metastable ions.

19. A laser as described in claim 14 wherein said means for providing an active medium provides an active medium consisting substantially only of lithium atoms.

* * * * *